April 15, 1941.   C. O. BRUESTLE   2,238,460

REEL ARBOR

Filed Sept. 30, 1939

INVENTOR
CARL O. BRUESTLE
BY
Gustave R. Thompson
ATTORNEY

Patented Apr. 15, 1941

2,238,460

UNITED STATES PATENT OFFICE 2,238,460

REEL ARBOR

Carl O. Bruestle, Rahway, N. J., assignor to Elevator Supplies Company, Incorporated, Rahway, N. J., a corporation of New Jersey Application September 30, 1939, Serial No. 297,297

3 Claims. (Cl. 242—72)

This invention relates to reel arbors for winding machines, and especially to the reel arbors of high speed machines for winding wire, and provides improvements therein.

In winding the finer sizes of wire, the reel arbor is operated at speeds ranging from about 2000 to 8000 revolutions per minute. To avoid vibration of the arbors and reels, especially at the higher speeds, it is necessary that the reels be very carefully centered on the driving arbor. The reels for these high speed machines are accurately formed, being manufactured true to specifications, the arbor shaft being ground to size, and the reel dynamically balanced. Heretofore the useful life of the spools has been limited. Shocks transmitted to the reel in starting and stopping the reel arbor, distort the reel and the driving connections between the arbor and the reel, and when this occurs, the reels must be discarded.

The present invention provides a reel arbor constructed so that the reel is securely fastened and held in a truly centered position on the arbor, in such manner that the reel is not distorted or injured by the sudden starting and stopping of the arbor, and the reel is thereby given an increased useful life.

The invention further provides a means for quickly and readily mounting and dismounting the reel from the arbor shaft. The invention may further include safety means for preventing the axial displacement of the reel in case of accidental loosening of the driving connection between the reel and the arbor during rotation.

An embodiment of the invention is illustrated in the accompanying drawing, wherein.

Figure 1:
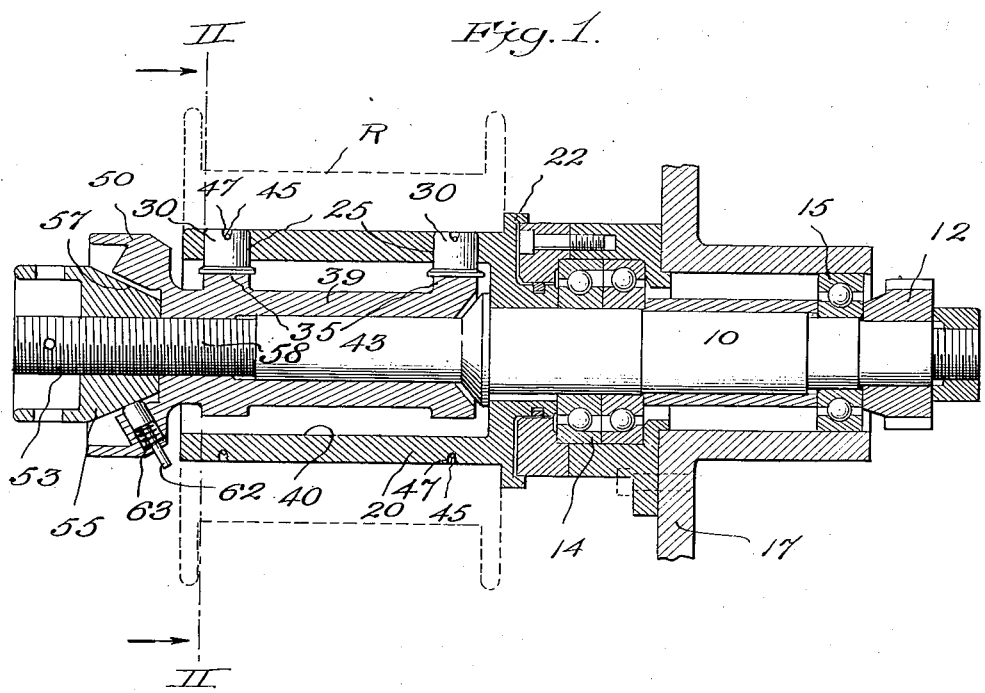
Fig. 1 is a transverse vertical section along the reel arbor.
Figure 2:
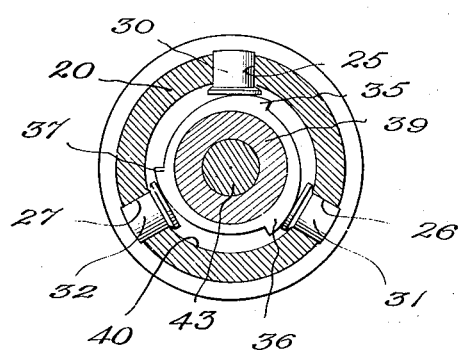
Fig. 2 is a transverse section on the line II—II, Fig. 1.

Referring to said drawing, numeral 10 designates the reel arbor which is rotated in suitable manner as by means, not shown, acting through a pinion 12 on the arbor. The arbor 10 turns in suitable bearings, as indicated at 14, 15, suitably mounted, as in the wall or partition 17 of a wire drawing machine. The arbor has thereon a cylindrical portion 20 having a diameter closely corresponding to the diameter of the bore of a reel R to be used thereon, and on which cylindrical portion the reel fits when placed on the arbor. A shoulder 22 on the cylindrical portion 20 limits the axial position of the reel in one direction.

The cylindrical portion 20 has formed therein openings in at least three places symmetrically spaced radially around the axis of the arbor. As here shown there are three of these radially symmetrically spaced openings, 25, 26 and 27. Contactors 30, 31, 32 are located in the openings 25, 26, 27 and are arranged to be projected slightly beyond the surface of the cylindrical portion 20 of the reel to contact with the surface of the reel R facing the bore therein.

Means are provided for simultaneously and quickly projecting the reel contactors 30, 31, 32 into binding contact with the surface of the reel R in the bore therein. The projecting means advantageously comprises a series of cams 35, 36, 37, of symmetrical form, arranged to make contact with the reel contactors 30, 31, 32. These cams may be formed or mounted on a part 39 capable of movement with relation to the contactors, so that the rise of the cams may be employed to equally and simultaneously project the reel contactors 30, 31, 32. The part 39 is advantageously a sleeve which fits within a bore 40 formed in the cylindrical portion 20 of the arbor. The direction of the cams and the direction of the movement of the part or sleeve 39 is preferably in a circular path around the axis of the arbor, as shown, and the arbor is preferably formed with a stud shaft 43 which projects through the sleeve 39, and on which the sleeve 39 fits for retracting the reel contactors 30, 31, 32 and a coil spring ring 45 may be provided for pressing the contactors inwardly. The structure is favorably arranged as regards the position of the spring ring below the surface of the cylindrical portion 20, by providing said cylindrical portion 20 with a circumferential groove 47, and continuations of said groove across outer ends of the reel contactors 30, 31, 32. The sleeve 39 is conveniently provided with a knob 50 for moving it to impart simultaneous action to the cams 35, 36, 37 thereon. With the construction and arrangement shown, turning of the knob 50 in a counterclockwise direction would bring the rise of the cams against the contactors, and by turning the knob 50 in the opposite direction the rise of the cams would be moved away from the reel contactors, and the spring 45 will act to retract the contactors.

Means are preferably provided for locking the sleeve or part 39 against movement, so that the reel contactors 30, 31, 32 which are acted on by the cams on said part 39, may be locked in reel contacting position. To this end the end of the stud shaft 43 may be threaded, as indicated at 53, and a locking nut 55 threaded thereon. The inner end of the nut is advantageously frustro-conical, as indicated at 57, for the purpose hereinafter stated. The sleeve 39 may also have a nut or threaded portion 58 which engages the threads on the stud shaft 43. The threads on the end of stud shaft 43 have a direction opposite to that of the direction of the rotation of the arbor, so that the tendency of the nut 55 during rotation of the arbor, will be to press it against the sleeve 39. The nut 55 when tightened jams the threads 58 on the sleeve 39 against the threads on stud shaft 43 and thereby locks the sleeve and nut against movement.

Means are also preferably provided for preventing longitudinal displacement of the reel R, in case of accidental starting of rotation of the spindle before the reel is clamped on the arbor, or in case of accidental loosening of the reel contacting means. For this purpose the part 39 is provided with a retractable stop 62 positioned thereon so that it may project alongside of the reel at its outer face. In its retracted position, the stop does not project beyond the surface of the cylindrical part 20 of the arbor, and allows the reel to be readily placed on and removed from the cylindrical portion 20 of the arbor. The stop 62 may be normally pressed inward by a suitably arranged spring 63, and it is advantageously advanced or projected into reel engaging position simultaneously with the locking of the sleeve or part 39 in position. As heretofore explained, nut 55 which is used for locking the said part 39 in position, is provided with a conical face 57. This face 57 bears against the stop 62, and when the nut is advanced on the threads 53 to lock the part 39 in position, it simultaneously acts on the stop 62 to project it outwardly alongside of the outer face of the reel R.

*Operation*

To place a reel on the arbor so that its bore rests on the cylindrical portion 20, the contactors 30, 31, and 32 are retracted flush with or slightly below the surface of the cylindrical portion 20. In the form of the invention illustrated, this may be done by turning the sleeve of part 39, through the knob 50, in a direction to cause the contactors to ride down the rises of the cams 35, 36, 37. With a stop 62 such as shown, the loosening of the locking nut 55 to permit of the movement of the sleeve 39, would allow the spring 63 to retract the said stop 62 so that it would not project beyond the surface of the cylindrical portion 20. In this position a reel would be placed on the arbor with the bore thereof fitting on the cylindrical portion 20. The knob 50 would then be turned to bring the rises of the cam 35, 36, 37 against the contactors 30, 31 and 32, thereby quickly, equally and simultaneously projecting said contactors 30, 31, 32. The amount of projection is slight, only sufficient to cause the contactors to make binding contact with the reel within the bore at symmetrical points. The construction of the cams and the contactors is such that the movement of all the contactors is equal. The simultaneous, equal, movement of the contactors will therefore center the reel R on the arbor. The sleeve or part 39 may then be locked in a position so that during rotation the reel will not become loose from the arbor. This may be done by turning the nut 55, which forces the threads 58 on sleeve 39 against the threads on stud shaft 43. The threads on the nut and stud shaft having a direction opposite to the direction of rotation of the arbor will have a tendency to force the nut against the sleeve in its locking direction. The turning of the nut 55, through the action of its conical part 57 on the stop 62, as just described, will simultaneously project the stop 62 from a position below the surface of the cylindrical portion 20 to a position above the surface thereof alongside of the outer side of the reel R. With the stop 62 in this position, the reel cannot move sideways off the arbor, should it accidentally become loose on the arbor.

The invention may receive other embodiments than that herein specifically illustrated and described.

What is claimed is:

1. A reel arbor for high speed winding machines comprising a cylindrical portion on which the central bore of a reel or spool fits, openings in said cylindrical portion of the arbor in at least three places symmetrically spaced radially around the axis of the arbor, said openings being positioned intermediate the sides of a reel when in position on said arbor, reel contactors in said openings arranged to be projected beyond the surface of said cylindrical portion and against a reel within the bore of the reel, and means for projecting said contactors comprising a sleeve within said cylindrical portion having thereon a plurality of cams, said cams being symmetrically spaced radially corresponding to the spacing of said contactors and being arranged to contact with said reel contactors to project them outwardly, a stud-shaft having an inner shoulder and a threaded end extending through said sleeve, and a nut on said stud-shaft arranged to be tightened against said sleeve to press the latter against said shoulder to hold said sleeve in the position thereof in which the cams thereon press the contactors against the reel.

2. A reel arbor for high speed winding machines, comprising a cylindrical portion on which the central bore of a reel or spool fits, openings in said cylindrical portion of the arbor in at least three places symmetrically spaced radially around the axis of the arbor, said openings being positioned intermediate the sides of a reel when in position on said arbor, reel contactors in said openings arranged to be projected beyond the surface of said cylindrical portion and against a reel within the bore of the reel, and means for projecting said contactors comprising a sleeve within said cylindrical portion having thereon a plurality of cams, said cams being symmetrically spaced radially corresponding to the spacing of said contactors and being arranged to contact with said reel contactors to project them outwardly, a stud-shaft having an inner shoulder and a threaded end extending through said sleeve, and a nut on said stud-shaft arranged to be tightened against said sleeve to press the latter against the shoulder to hold said sleeve in the position thereof in which the cams thereon press the contactors against the reel, the direction of the threads on said stud-shaft being opposite to the direction of rotation of the arbor.

3. A reel arbor for high speed winding machines, comprising a cylindrical portion on which the central bore of a reel or spool fits, openings in said cylindrical portion of the arbor in at least three places symmetrically spaced radially around the axis of the arbor, said openings being positioned intermediate the sides of a reel when in position on said arbor, reel contactors in said openings arranged to be projected beyond the surface of said cylindrical portion and against a reel within the bore of the reel, and means for projecting said contactors comprising a sleeve within said cylindrical portion having thereon a plurality of cams, said cams being symmetrically spaced radially corresponding to the spacing of said contactors and being arranged to contact with said reel contactors to project them outwardly, a stud-shaft having an inner shoulder and a threaded end extending through said sleeve, and a nut on said stud-shaft arranged to be tightened against said sleeve to press the latter against said shoulder to hold said sleeve in the position thereof in which the cams thereon press the contactors against the reel, and a retractable stop positioned outward of the cylindrical portion of the arbor on which said reel fits, said nut being arranged to coact with said stop to project it alongside said reel to hold it against axial displacement.

CARL O. BRUESTLE.